(12) United States Patent
Chahal et al.

(10) Patent No.: US 12,078,074 B2
(45) Date of Patent: Sep. 3, 2024

(54) SYSTEM AND METHOD FOR DETECTING AN UNCOMMANDED OR UNCONTROLLABLE HIGH THRUST EVENT IN AN AIRCRAFT

(71) Applicant: PRATT & WHITNEY CANADA CORP., Longueuil (CA)

(72) Inventors: Jasraj Chahal, Lasalle (CA); Zachary Mounir Faty, Montreal (CA); Carmine Lisio, Laval (CA); Darragh McGrath, Montreal (CA); Giancarlo Zingaro, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1165 days.

(21) Appl. No.: 16/410,270

(22) Filed: May 13, 2019

(65) Prior Publication Data
US 2020/0362723 A1    Nov. 19, 2020

(51) Int. Cl.
  *F01D 21/02*    (2006.01)
  *F01D 21/14*    (2006.01)
  *F02C 9/44*     (2006.01)
  *F02C 9/58*     (2006.01)

(52) U.S. Cl.
  CPC ............. *F01D 21/02* (2013.01); *F01D 21/14* (2013.01); *F02C 9/44* (2013.01); *F02C 9/58* (2013.01); *F05D 2270/021* (2013.01); *F05D 2270/051* (2013.01)

(58) Field of Classification Search
  None
  See application file for complete search history.

(56) References Cited

U.S. PATENT DOCUMENTS

| | | | |
|---|---|---|---|
| 2,365,951 A | 12/1944 | Hamilton | |
| 2,597,020 A | 5/1952 | Nissen | |
| 4,845,617 A * | 7/1989 | Kamenetz | B64D 31/10 702/182 |
| 5,019,006 A * | 5/1991 | Schneider | B64C 11/40 416/43 |
| 6,196,189 B1 * | 3/2001 | Baldwin | F02D 41/0007 123/352 |
| 2003/0205042 A1 * | 11/2003 | Walker | F02C 9/28 60/204 |
| 2016/0281528 A1 * | 9/2016 | Penda | F01D 21/003 |
| 2019/0047715 A1 | 2/2019 | Hedrick | |
| 2019/0389562 A1 * | 12/2019 | Garabello | B64C 11/42 |

* cited by examiner

*Primary Examiner* — Arun Goyal
*Assistant Examiner* — William L Breazeal
(74) *Attorney, Agent, or Firm* — NORTON ROSE FULBRIGHT CANADA LLP

(57) ABSTRACT

System and method for detecting an uncommanded high thrust (UHT) event in an aircraft. The method comprises enabling a UHT function associated with an engine when an enabling condition has been met. When the UHT function is enabled, the UHT event is detected when a power lever of the aircraft is at a given position, a parameter indicative of engine speed or power is above a first threshold, and a rate of change of the engine speed is above a second threshold. In response to detecting the UHT event, an alert is output to trigger accommodations to the UHT event for the engine.

16 Claims, 8 Drawing Sheets

US 12,078,074 B2

SYSTEM AND METHOD FOR DETECTING AN UNCOMMANDED OR UNCONTROLLABLE HIGH THRUST EVENT IN AN AIRCRAFT

TECHNICAL FIELD

The present disclosure relates generally to detecting asymmetric thrust on multi-engine aircraft.

BACKGROUND OF THE ART

A failure to the thrust control system of an aircraft's engine can result in an uncommanded or uncontrollable high thrust (UHT) event. On a multi-engine aircraft, a UHT event can result in asymmetric thrust provided by the set of engines. During certain critical flight phases, this can lead to hazardous situations. For example, during landing or take-off, a UHT event may cause the aircraft to depart laterally or off the end of the runway.

Pilots have high workloads and reacting to a UHT event requires split second decision making during the critical flight phases. Therefore, there is a need to provide detection and accommodation of UHT in conjunction with a declared intention of the pilot to command low thrust.

SUMMARY

In accordance with a broad aspect, there is provided a method for detecting an uncommanded high thrust (UHT) event in an aircraft. The method comprises enabling a UHT function associated with an engine when an enabling condition has been met. When the UHT function is enabled, the UHT event is detected when a power lever of the aircraft is at a given position, a parameter indicative of engine speed or power is above a first threshold, and a rate of change of the engine speed is above a second threshold. In response to detecting the UHT event, an alert is output to trigger accommodations to the UHT event for the engine.

In accordance with another broad aspect, there is provided system for detecting an uncommanded high thrust (UHT) event in an aircraft. The system comprises at least one processing unit and a non-transitory computer-readable medium having stored thereon program code executable by the at least one processing unit for enabling a UHT function associated with an engine when an enabling condition has been met. When the UHT function is enabled, the UHT event is detected when a power lever of the aircraft is at a given position, a parameter indicative of engine speed or power is above a first threshold, and a rate of change of the engine speed is above a second threshold. In response to detecting the UHT event, an alert is output to trigger accommodations to the UHT event for the engine.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There is described herein detection methods and systems for uncommanded or uncontrollable high thrust (UHT) events. Throughout the disclosure, reference to an "uncommanded high thrust event" will also encompass an "uncontrollable high thrust event", and vice versa. A UHT event is defined as a failure to respond to a low thrust command on the part of the engine, thus resulting in excess thrust relative to the command. Many types of failures may result in a UHT event, such as but not limited to a fuel metering valve (FMV) that is runaway or is stuck open. In both of these cases, fuel flow does not correspond to a position of a power lever or throttle.

Turboprop engines have thrust contributions from the engine as well as from the propeller, as a function of the position of the propeller blades. As such, UHT detection for turboprop engines differs from UHT detection from engines without propellers, such as turbofan engines.

Figure 1:
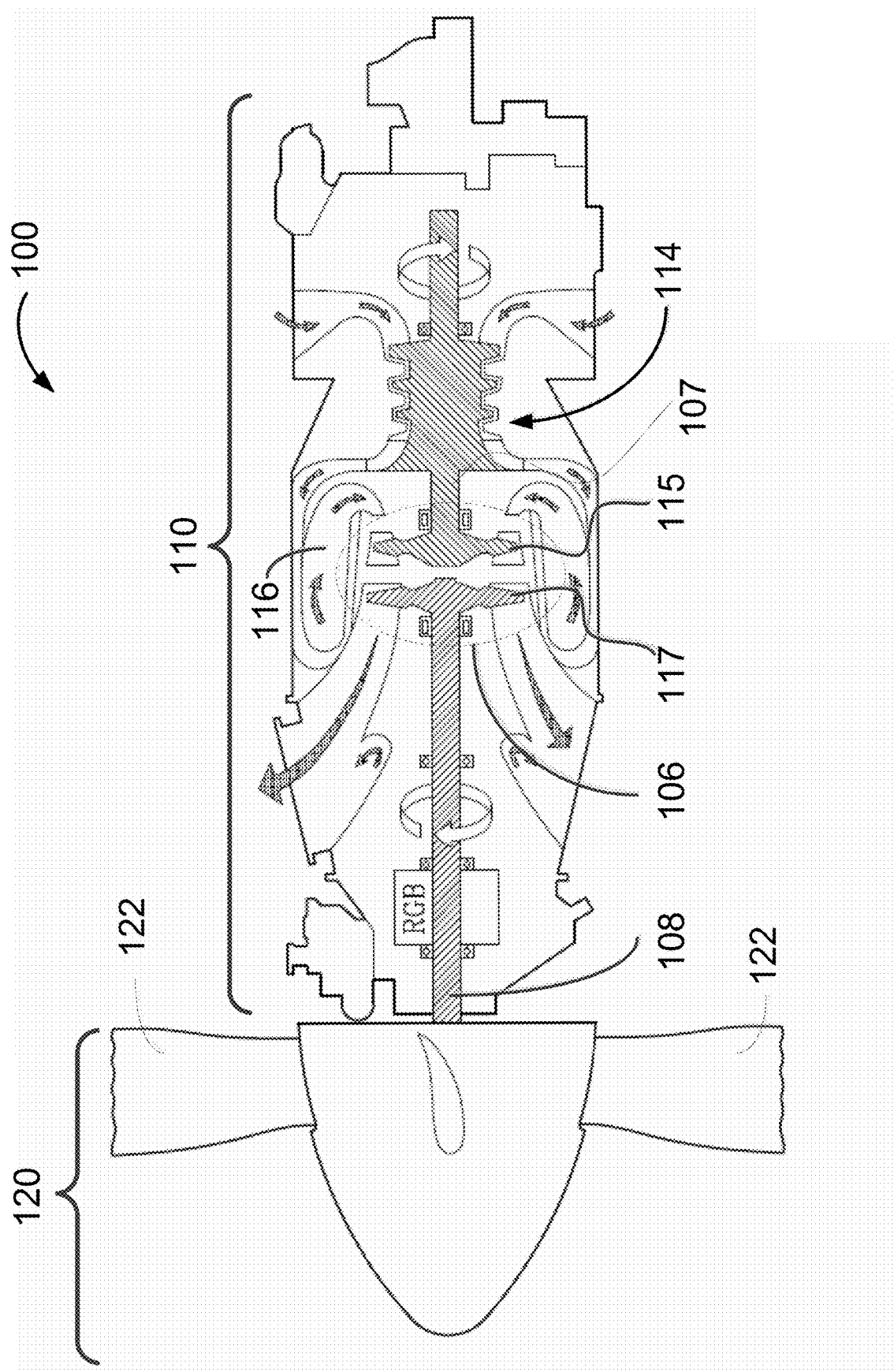
FIG. 1 is a schematic cross-sectional view of a gas turbine engine and propeller system, in accordance with at least some embodiments.

An example turboprop engine is illustrated in FIG. 1. An aircraft powerplant 100 generally comprises an engine 110 and a propeller 120. The powerplant 100 comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases driving the rotation of the combustor through shaft 107 and the propeller 120 through shaft 108. The turbine section is formed of a high pressure turbine 115 and a low pressure turbine 117. The high pressure turbine 115 and compressor section 114 together form the gas generator of the engine 110.

The propeller 120 converts rotary motion from the shaft 108 of the engine 110 to provide propulsive force for the aircraft, also known as thrust. The propeller 120 may be a variable-pitch propeller capable of generating forward and reverse thrust. The propeller 120 comprises two or more propeller blades 122. A blade angle of the propeller blades 122 may be adjusted. The blade angle may be referred to as a beta angle, an angle of attack or a blade pitch. The powerplant 100 may be implemented to comprise a single or multi-spool gas turbine engine, where the turbine section 106 is typically connected to the propeller 120 through a reduction gearbox (RGB).

Figure 2:
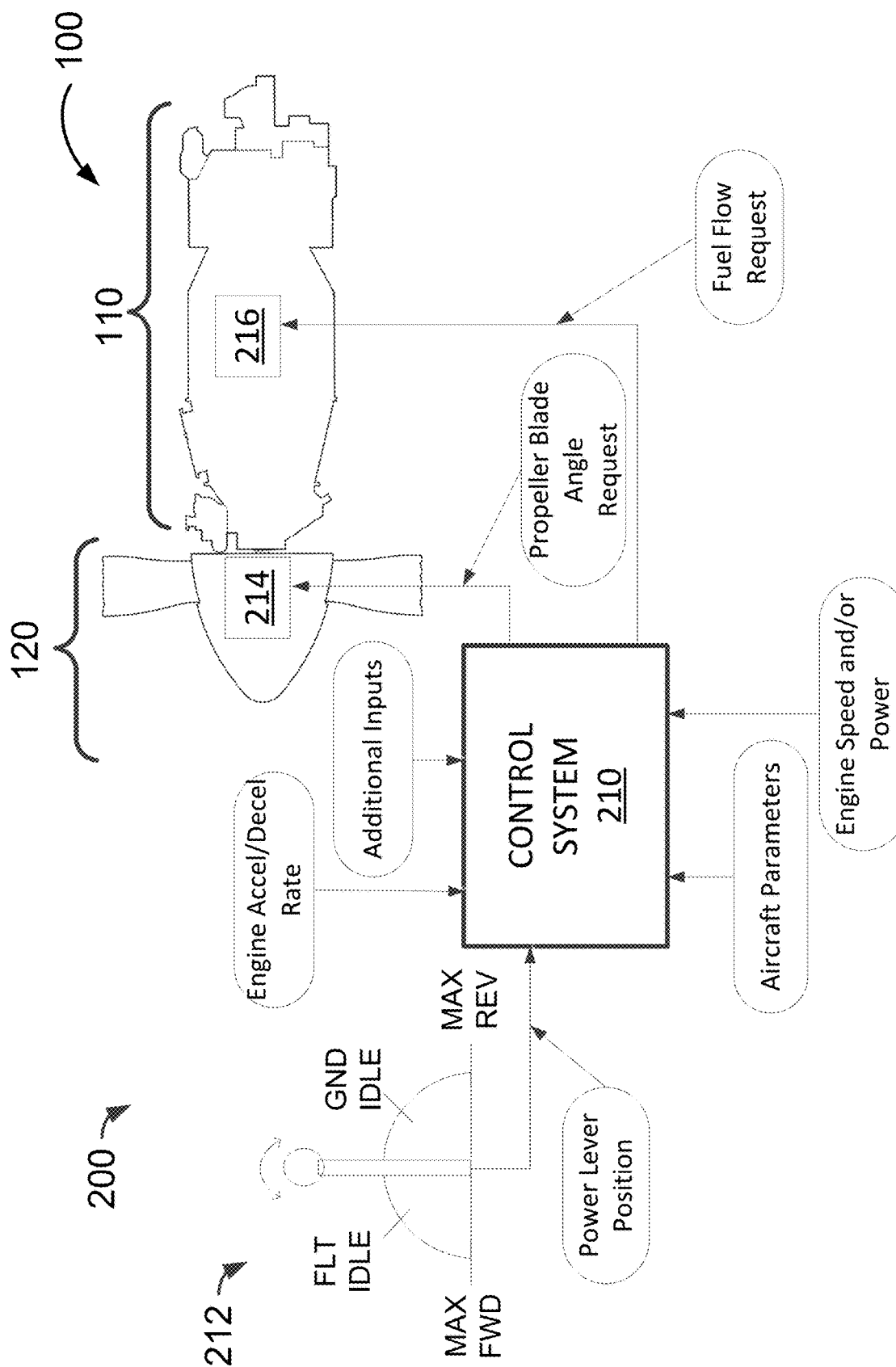
FIG. 2 is a block diagram of a system for operating a powerplant in accordance with at least some embodiments.

With reference to FIG. 2, there is illustrated a system 200 for operating the powerplant 100. A control system 210 receives a power lever or throttle position from a power lever 212 of the aircraft under control by a pilot or other operator of the aircraft. The power lever position is indicative of the type of thrust demanded by the power lever 212.

Several power lever positions can be selected, including those for (1) maximum forward thrust (MAX FWD), which is typically used during takeoff; (2) flight idle (FLT IDLE), which may be used during approach in flight or during taxiing on the ground; (3) ground idle (GND IDLE), at which the propeller 120 is spinning, but providing very low thrust; and (4) maximum reverse thrust (MAX REV), which is typically used at landing in order to slow the aircraft. Intermediate positions between the abovementioned positions can also be selected. The power lever positions may vary depending on practical implementations of the power lever 212.

The control system 210 receives inputs pertaining to the operation of the propeller 120, engine 110 and/or the aircraft. The control system 210 is configured for detecting UHT events using one or more of the inputs received. In the illustrated embodiment, the control system 210 receives engine speed and/or power. The engine speed and/or power may be received from one or more sensors provided at or proximate to the powerplant 100. For example, engine speed may refer to a rotational speed of the shaft 108, or it may refer to a rotational speed of the gas generator (also known as "Ng"). These values may be measured directly from the engine 110 and provided to the control system 210. In some embodiments, engine power, for example horsepower of the shaft 108 (also known as "SHP"), may be determined using the shaft rotational speed as received by the control system 210. In some embodiments, the engine speed and/or power is provided to the control system 210 from another engine and/or aircraft system.

In some embodiments, the control system 210 receives an engine acceleration/deceleration rate, for example a rate of change of the gas generator speed (also known as "NgDot") or of the rotational speed of the shaft 108. Alternatively, the engine acceleration/deceleration rate is calculated by the control system 210 based on the engine speed.

In some embodiments, the control system 210 receives aircraft parameters, such as aircraft altitude and phase of flight. For example, the phase of flight may indicate that the aircraft is in any one of take-off, final approach, landing, or cruise phase. The phase of flight parameter may take various forms, such as a weight-on-wheels indicator, an aircraft airspeed, a cockpit input, and the like. The aircraft parameters may be received from an aircraft computer. In some embodiments, the phase of flight is determined by the control system 210 based on a combination of inputs received by the control system 210.

The additional inputs received by the control system 210 may vary depending on practical implementations.

In general, the control system 210 is configured to control the engine 110 and the propeller 120 based on the received inputs. The control system 210 controls the engine 110 by outputting a fuel flow request to an engine actuator 216 for adjusting engine fuel flow and controls the propeller 120 by outputting a propeller blade angle request to a propeller actuator 214 for adjusting the blade angle of the propeller 120. The engine actuator 216 and/or propeller actuator 214 may each be implemented as a torque motor, a stepper motor, or any other suitable actuator. The engine actuator 216 may be implemented as one or more valves that regulate fuel flow from a fuel source to the engine 110. The control system 210 determines the fuel flow request for adjusting engine fuel flow and the propeller blade angle request for adjusting the blade angle of the propeller 120 based on the received inputs. The propeller actuator 214 may control hydraulic oil pressure to adjust the blade angle based on the propeller blade angle request. In some embodiments, the propeller blade angle request is an oil flow request to set the propeller blade angle. The engine actuator 216 can adjust the fuel flow to the engine 110 based on the fuel flow request. While the engine actuator 216 and the propeller actuator 214 are illustrated as being part of the engine 110 and the propeller 120, respectively, it should be understood that this is for illustrative purposes only and that the engine actuator 216 and/or the propeller actuator 214 may, in some embodiments, be separate from the powerplant 100. While the controller 210 is illustrated as separate from the powerplant 100, it should be understood that this is for illustrative purposes only and that the controller 210 may, in some embodiments, be integrated with the powerplant 100.

Figure 3:
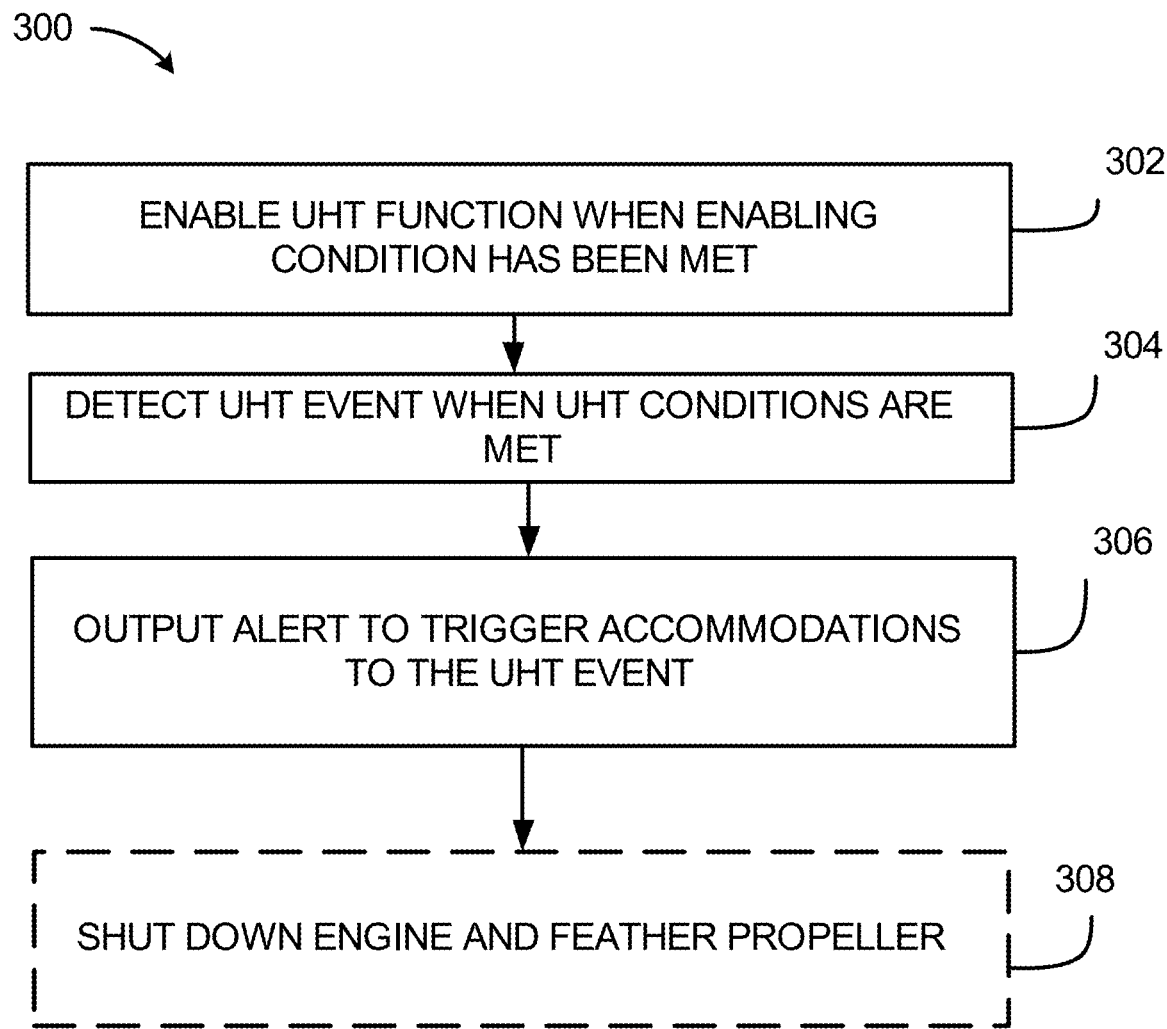
FIG. 3 is a flowchart of a method for detecting a UHT event, in accordance with at least some embodiments.

Referring now to FIG. 3, there is illustrated an example method 300 for detection of a UHT event associated with the powerplant 100, for example by the control system 210. Note that the control system 210 may be an electronic engine controller (EEC), a propeller electronic controller (PEC), or a combination thereof. The EEC and PEC can communicate with one another to exchange parameters of the powerplant 100.

At step 302, a UHT function is enabled when an enabling condition has been met. The enabling condition may comprise an aircraft altitude, a phase of flight, and/or any other condition for which it is desired to limit application of the UHT detection method. In some embodiments, the enabling condition is that the aircraft is at an altitude that is less than 15,000 feet. Other altitudes may also be used. In some embodiments, the enabling condition is a constant value in software that may be modified for various applications.

At step 304, a UHT event is detected when UHT conditions are met, once the UHT function is enabled. In some embodiments, the UHT conditions comprise a position of the power lever of the aircraft. The position may correspond to a specific setting on the power lever, such as flight idle or ground idle, or to an angular position of the power lever. For example, the power lever position may be determined as a function of a power lever angle (PLA), and a UHT condition may be met when the PLA is less than a value "x". In some embodiments, the value "x" is a constant value in software that may be modified for various applications.

In some embodiments, the UHT conditions comprise an engine power or speed being above a first threshold. For example, the first threshold may be a power threshold and the UHT condition is met when SHP of the engine increases above the power threshold. In another example, the first threshold is a requested Ng and the UHT condition is met when an actual Ng increases above the requested Ng.

Figure 4:
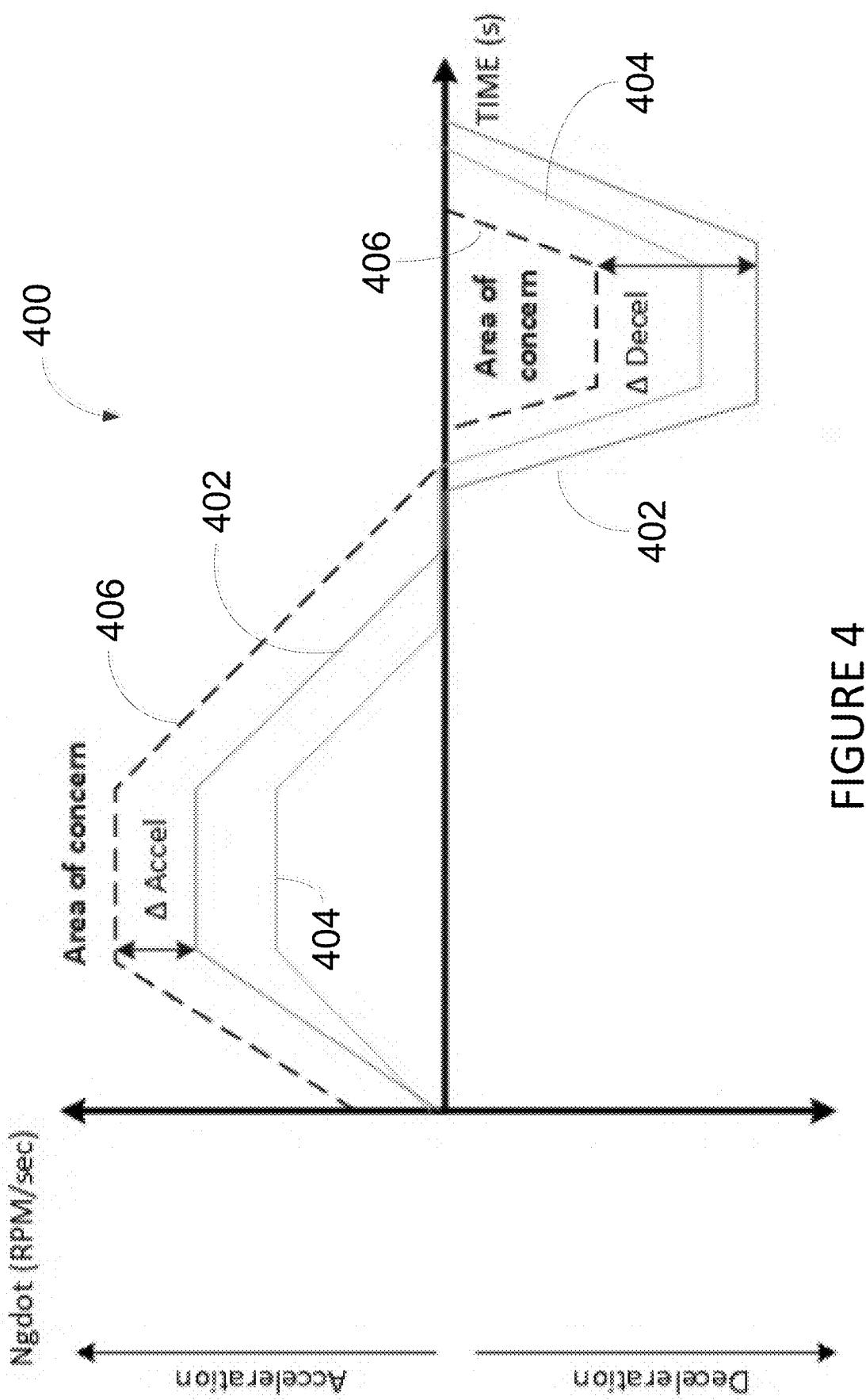
FIG. 4 is a graph illustrating rate of change of engine speed, in accordance with at least some embodiments.

In some embodiments, the UHT conditions comprise a rate of change of the engine speed being above a second threshold. For example, the second threshold may be a requested NgDot and the UHT condition is met when the actual NgDot increases above the requested NgDot. The second threshold may be the requested NgDot+a margin. The margin may be set using a typical or known response time for an efficient engine when considering a positive rate of change of the engine speed (i.e. acceleration). The margin may be set using a typical or known response time for an inefficient engine when considering a negative rate of change of the engine speed (i.e. deceleration). In other words, the margin corresponds to a value that is greater than an expected response time for an efficient or inefficient engine, as appropriate. With reference to FIG. 4, a graph 400 illustrates the rate of change of the speed of an engine, as requested (curve 402) and actual (curve 404). The threshold (curve 406) is separated from the requested rate of change (curve 402) by the margin (ΔAccel/ΔDecel). Whether the engine is accelerating or decelerating, the UHT condition is met when the actual rate of change (curve 404) is above the threshold (curve 406).

In some embodiments, the UHT conditions are met when a combination of conditions are present. For example, the UHT conditions are met when the power lever is at a given position, an engine speed or power is above a first threshold, and a rate of change of the engine speed is above a second threshold.

Referring back to FIG. 3, at step 306, an alert is output in response to detecting the UHT event, in order to trigger accommodations to the UHT event. The alert may be sent to a cockpit of the aircraft, an aircraft computer, an engine computer, or any other aircraft or engine system. In some embodiments, in response to the alert, the engine that is providing uncommanded high thrust is shut down and the corresponding propeller is feathered, as per step 308. Propeller feathering, which is possible with variable pitch propellers, refers to turning the blades of the propeller such that they are substantially parallel with airflow and they create minimal air resistance. On a multi-engine aircraft, feathering the propeller on an inoperative engine reduces drag and thrust from the inoperative engine and helps maintain speed and attitude with the operative engines.

In some embodiments, engine shutdown and propeller feathering is performed automatically upon detection of the UHT event. An automatic engine shutdown and propeller feathering is understood to mean that it is done without additional pilot input, or without an explicit request or command from an operator of the aircraft. As per FIG. 2, the control system 210 will shut down the engine 110 via the fuel flow request and feather the propeller 120 via the propeller blade angle request.

Figure 5:
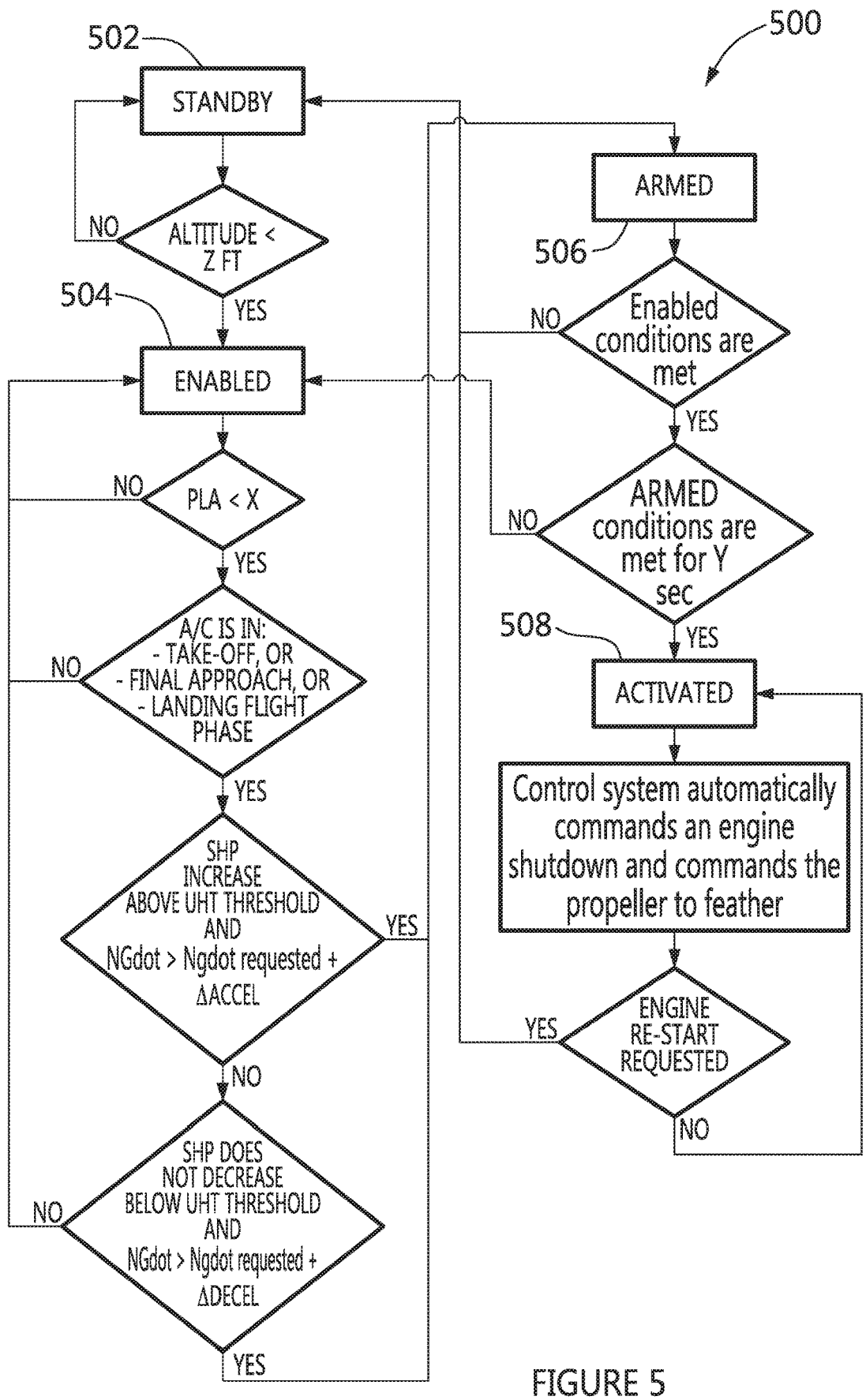
FIG. 5 is a flowchart of a method for detecting a UHT event having four states for a UHT function, in accordance with at least some embodiments.

A specific and non-limiting example of the method for detecting a UHT event is illustrated in FIG. 5. In this example, there are four states for the UHT function, namely standby 502, enabled 504, armed 506, and activated 508. The UHT function is in standby 502 when the enabling conditions have not yet been met. In this example, the enabling conditions comprise a given altitude for the aircraft. When the aircraft is below the given altitude, the UHT function becomes enabled 504. While enabled, the method 500 can detect the UHT conditions that will cause the UHT function to become armed 506. In this example, there are three UHT conditions used to confirm the UHT event: power lever position, flight phase, and one of the following: SHP increases above a threshold and NgDot>NgDot requested+a margin; or SHP does not go below a threshold and NgDot>NgDot requested+a margin. Examples of the scenarios represented by the last condition are illustrated in FIGS. 6a-6c.

Figure 6A:
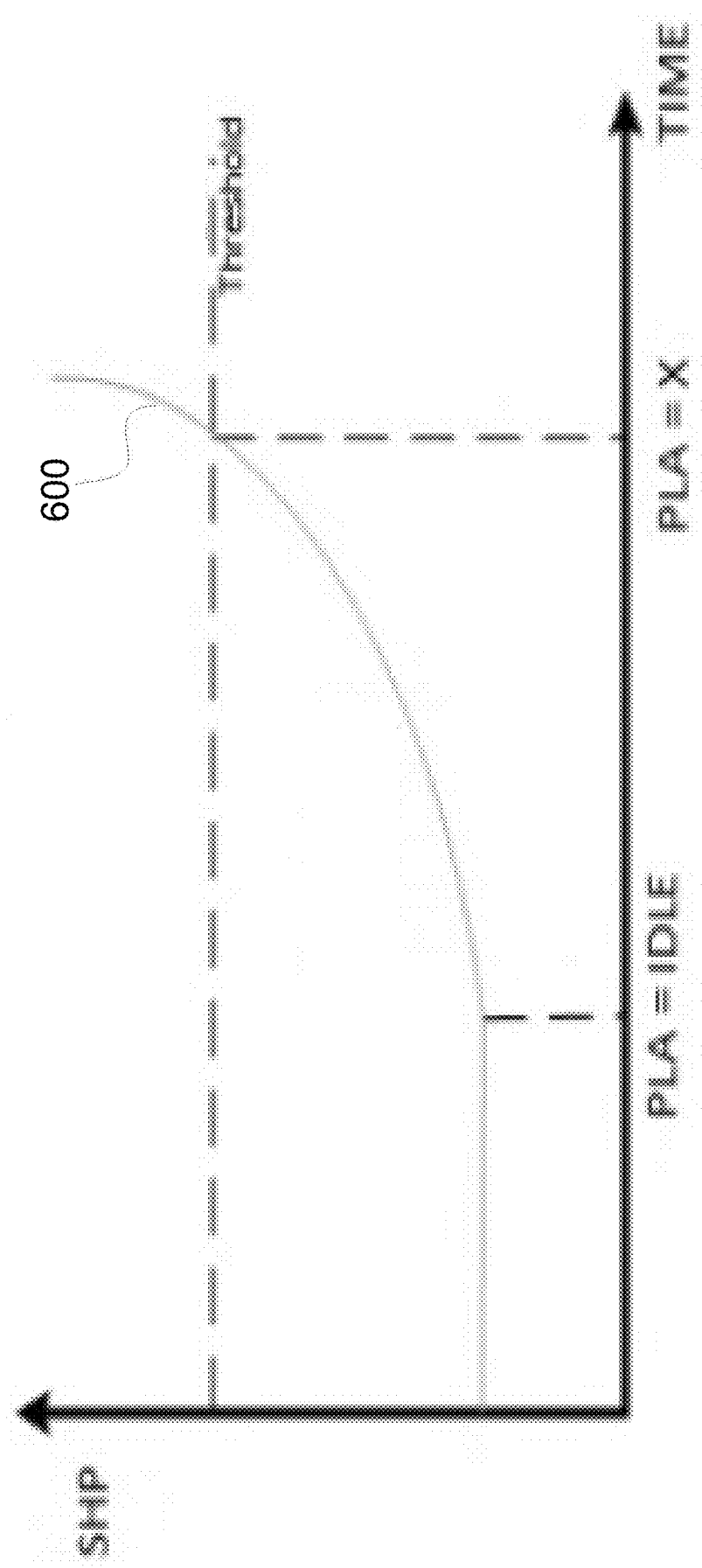
FIGS. 6a-6b are graphs illustrating example scenarios of failure conditions leading to UHT events.
Figure 6B:
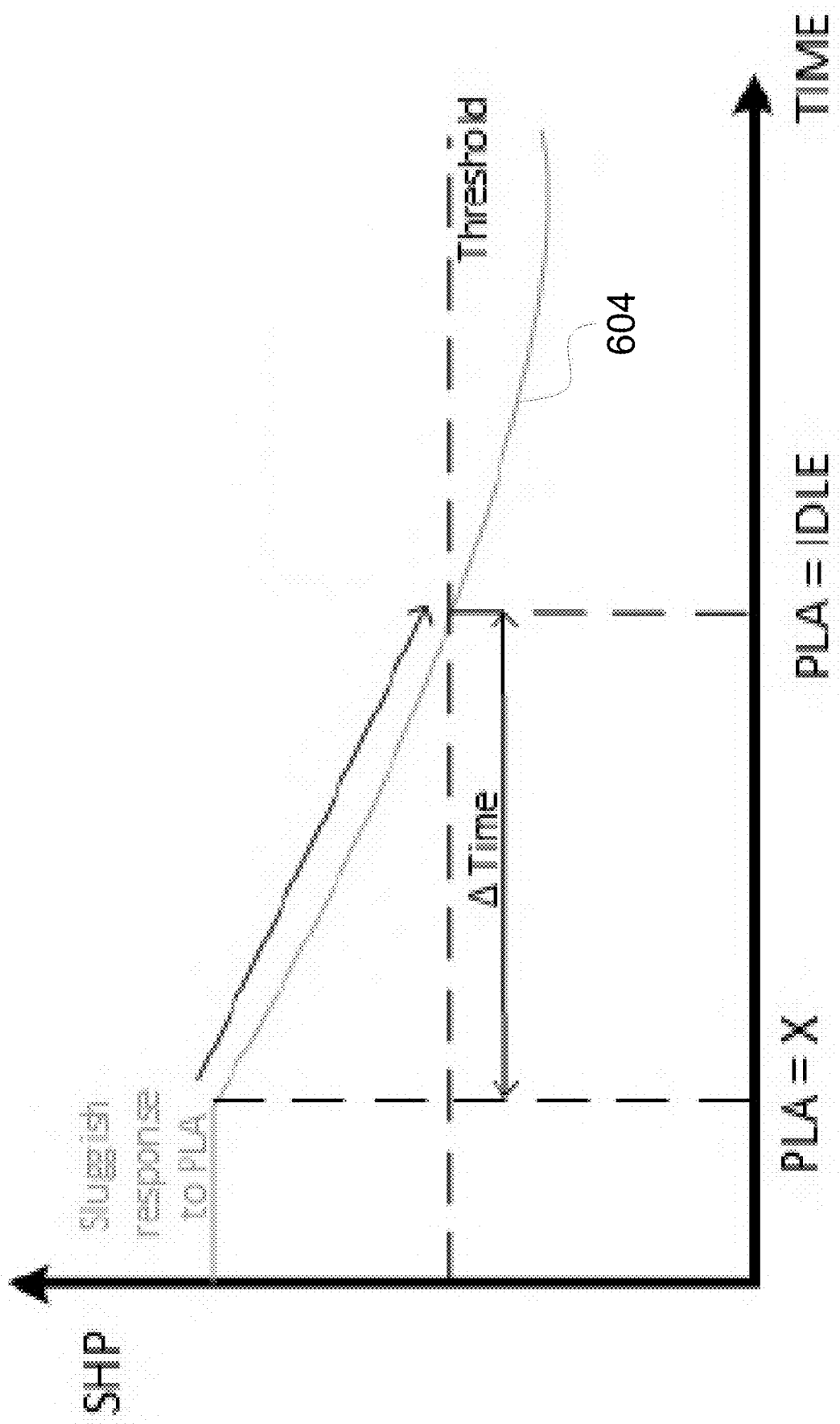

FIG. 6a illustrates a specific UHT scenario where the power of the powerplant increases faster than it should. As shown from the curve 600, SHP accelerates beyond a threshold despite the power lever position. This scenario is illustrative of a runaway FMV, which can occur, for example, at landing, where the PLA is at a flight idle position and the powerplant's power is reduced. However, due to the runaway FMV, the powerplant's power begins to increase and continues to increase above the threshold.

FIG. 6c illustrates a specific UHT scenario where the power of the powerplant is not slowing down fast enough. Although the power is decelerating, the curve 604 crosses a threshold when the PLA is moved to idle. This scenario may occur, for example, during an aborted take-off where the PLA is set to the take-off position and the powerplant's power is at take-off power. When the take-off is to be aborted, the pilot moves the power lever from the take-off position to the flight idle position. However, due to the FMV being stuck open, the powerplant's power does not decrease fast enough or remains at high power, regardless of the PLA position.

Referring back to FIG. 5, when the UHT function is armed 506, an additional verification that the enabling conditions are still met may be performed. This is to account for a scenario where parameters associated with the enabling conditions change during the transition from enabled 504 to armed 506. If the enabling conditions are no longer met, the UHT function returns to standby 502. In some embodiments, the UHT function will move from the armed 506 to the activated 508 state only if the UHT conditions persist for a given amount of time, such as "Y" seconds. In some embodiments, the value "Y" is a constant value in software that may be modified for various applications.

When the UHT function is activated 508, UHT accommodations may be performed, such as shutting down the engine and feathering the propeller. A re-start request received by a pilot or other aircraft operator may transition the UHT function back to the stand-by 502 state.

Note that more or less states for the UHT function may be provided. For example, in some embodiments, the UHT function may transition from enabled to activated without passing through the armed state, thus omitting additional verifications for enabling conditions and persistent UHT conditions. In some embodiments, the additional verifications are performed concurrently with the detection of the UHT conditions while the UHT function is in the enabled state. Other embodiments may also apply.

The methods 300, 500 thus provide detection of UHT events and in some cases, commanding of engine shutdown and propeller feathering. Asymmetric thrust above a UHT threshold is thus minimized to levels that are controllable by the pilot and the aircraft. In some embodiments, the control system 210 is configured for providing cockpit indication(s) advising of a current state of the UHT function, such as standby, enabled, armed, or activated. Other cockpit indications include indicating that the engine was commanded to shut down and/or that the propeller was commanded to feather. In some embodiments, the enabling and/or UHT conditions are also displayed in the cockpit when they are met.

Figure 7:
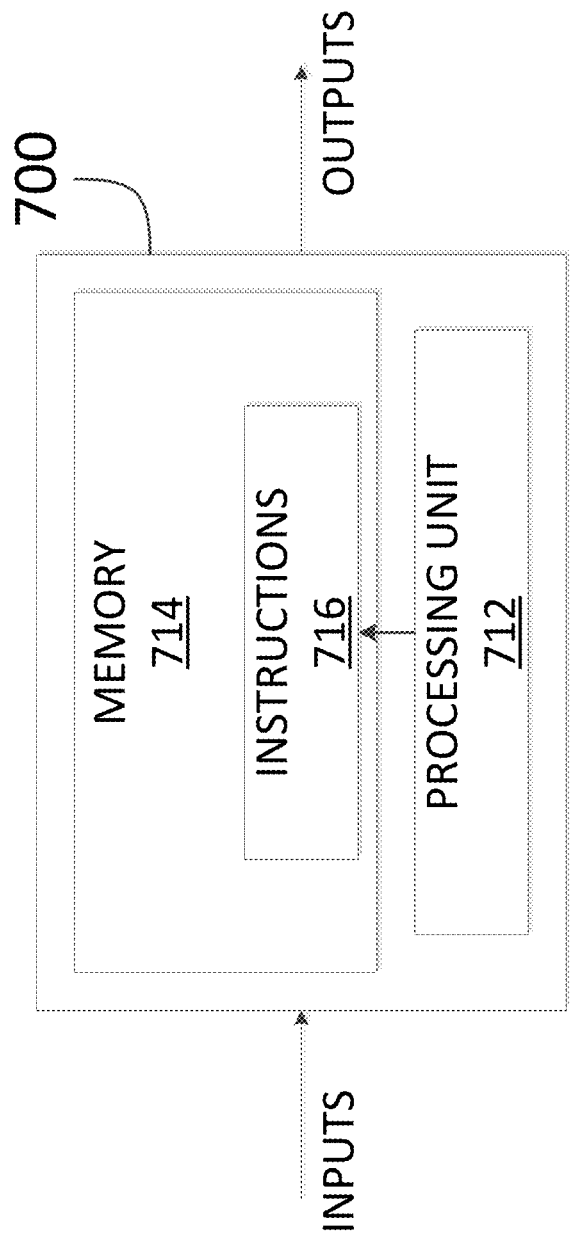
FIG. 7 is a block diagram of a computing device for implementing the control system of FIG. 2, in accordance with an illustrative embodiment.

With reference to FIG. 7, an example of a computing device 700 is illustrated. The control system 210 may be implemented with one or more computing devices 700. For example, each of a propeller controller and an engine controller may be implemented by a separate computing device 700 to perform the functions of the control system 210. The computing device 700 comprises a processing unit 712 and a memory 714 which has stored therein computer-executable instructions 716. The processing unit 712 may comprise any suitable devices configured to implement the methods 300, 500 such that instructions 716, when executed by the computing device 700 or other programmable apparatus, may cause the functions/acts/steps performed as part of the methods 300, 500 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. Note that the computing device 700 can be implemented as part of a full-authority digital engine controls (FADEC) or other similar device, including electronic engine control (EEC), engine control unit (ECU), electronic propeller control, propeller control unit, and the like.

The methods and systems for detecting a UHT event described herein may be implemented in a high level procedural or object oriented programming or scripting language, or a combination thereof, to communicate with or assist in the operation of a computer system, for example the computing device 700. Alternatively, the methods and systems for detecting a UHT event may be implemented in assembly or machine language. The language may be a compiled or interpreted language. Program code for implementing the methods and systems for detecting a UHT event may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting a UHT event may also be considered to be implemented by way of a non-transitory computer-readable storage medium having a computer program stored thereon. The computer program may comprise computer-readable instructions which cause a computer, or more specifically the processing unit 712 of the computing device 700, to operate in a specific and predefined manner to perform the functions described herein, for example those described in the methods 300, 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting a UHT event may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a powerplant of an aircraft during an uncommanded high thrust (UHT) event of the powerplant, the powerplant including an engine and a variable-pitch propeller driven by the engine, the method comprising:
    enabling a UHT detection function associated with the powerplant when an enabling condition has been met;
    when the UHT detection function is enabled, detecting the UHT event when:
        a power lever associated with the powerplant is at a given position;
        a parameter indicative of engine speed or engine power is above a first threshold;
        a rate of change of the engine speed is above a second threshold; and
        the aircraft is in a final approach phase of flight; and
    in response to detecting the UHT event:
        outputting an alert to trigger accommodations to the UHT event for the engine;
        automatically commanding the engine of the powerplant to shut down; and
        automatically commanding the variable-pitch propeller of the powerplant to feather.

2. The method of claim 1, wherein the enabling condition comprises a predetermined altitude of the aircraft.

3. The method of claim 1, wherein the parameter indicative of engine speed or engine power is a shaft horsepower of the engine.

4. The method of claim 1, wherein the parameter indicative of engine speed or engine power is a requested gas generator speed of the engine, and wherein the first threshold is an actual gas generator speed of the engine.

5. The method of claim 1, further comprising detecting the UHT event for a predetermined time before outputting the alert to trigger the accommodations.

6. The method of claim 1, wherein the second threshold is a requested rate of change of the engine speed plus a margin.

7. The method of claim 6, wherein the rate of change of the engine speed is a rate of acceleration of the engine, and wherein the margin comprises a response time for an efficient engine.

8. The method of claim 6, wherein the rate of change of the engine speed is a rate of deceleration of the engine, and wherein the margin comprises a response time for an inefficient engine.

9. A system for operating a powerplant of an aircraft during an uncommanded high thrust (UHT) event of the powerplant, the powerplant including an engine and a variable-pitch propeller driven by the engine, the system comprising:
    at least one processing unit; and
    a non-transitory computer-readable medium having stored thereon program code executable by the at least one processing unit for:

enabling a UHT detection function associated with the powerplant when an engine when an enabling condition has been met;

when the UHT detection function is enabled, detecting the UHT event when:
- a power lever associated with the powerplant is at a given position;
- a parameter indicative of engine speed or engine power is above a first threshold;
- a rate of change of the engine speed is above a second threshold; and
- the aircraft is in a final approach phase of flight; and in response to detecting the UHT event:
- outputting an alert to trigger accommodations to the UHT event for the engine;
- automatically commanding the engine of the powerplant to shut down; and
- automatically commanding the variable-pitch propeller of the power plant to feather.

10. The system of claim 9, wherein the enabling condition comprises a predetermined altitude of the aircraft.

11. The system of claim 9, wherein the parameter indicative of engine speed or engine power is a shaft horsepower of the engine.

12. The system of claim 9, wherein the parameter indicative of engine speed or engine power is a requested gas generator speed of the engine, and wherein the first threshold is an actual gas generator speed of the engine.

13. The system of claim 9, wherein the program code is further executable for detecting the UHT event for a predetermined time before outputting the alert to trigger the accommodations.

14. The system of claim 9, wherein the second threshold is a requested rate of change of the engine speed plus a margin.

15. The system of claim 14, wherein the rate of change of the engine speed is a rate of acceleration of the engine, and wherein the margin comprises a response time for an efficient engine.

16. The system of claim 14, wherein the rate of change of the engine speed is a rate of deceleration of the engine, and wherein the margin comprises a response time for an inefficient engine.

\* \* \* \* \*